(12) United States Patent
Schultz et al.

(10) Patent No.: US 9,100,825 B2
(45) Date of Patent: Aug. 4, 2015

(54) METHOD AND SYSTEM FOR MULTI-FACTOR BIOMETRIC AUTHENTICATION BASED ON DIFFERENT DEVICE CAPTURE MODALITIES

(71) Applicant: Verizon Patent and Licensing Inc., Basking Ridge, NJ (US)

(72) Inventors: Paul T. Schultz, Colorado Springs, CO (US); Robert A. Sartini, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 67 days.

(21) Appl. No.: 13/907,389

(22) Filed: May 31, 2013

(65) Prior Publication Data

US 2013/0267204 A1  Oct. 10, 2013

Related U.S. Application Data

(63) Continuation-in-part of application No. 13/407,079, filed on Feb. 28, 2012.

(51) Int. Cl.
*H04W 12/06* (2009.01)
*G06F 21/32* (2013.01)

(52) U.S. Cl.
CPC ............... *H04W 12/06* (2013.01); *G06F 21/32* (2013.01)

(58) Field of Classification Search
None
See application file for complete search history.

(56) References Cited

U.S. PATENT DOCUMENTS

| | | | |
|---|---|---|---|
| 6,219,639 B1 * | 4/2001 | Bakis et al. | 704/246 |
| 2002/0091937 A1 * | 7/2002 | Ortiz | 713/200 |
| 2002/0184538 A1 * | 12/2002 | Sugimura et al. | 713/202 |
| 2003/0120934 A1 * | 6/2003 | Ortiz | 713/186 |
| 2004/0059924 A1 * | 3/2004 | Soto et al. | 713/186 |
| 2005/0098621 A1 * | 5/2005 | de Sylva | 235/379 |
| 2005/0246291 A1 * | 11/2005 | Delgrosso et al. | 705/67 |
| 2006/0064037 A1 * | 3/2006 | Shalon et al. | 600/586 |
| 2007/0016777 A1 * | 1/2007 | Henderson et al. | 713/169 |
| 2008/0319507 A1 * | 12/2008 | Myers | 607/50 |
| 2009/0116703 A1 * | 5/2009 | Schultz | 382/118 |
| 2009/0292216 A1 * | 11/2009 | Krch et al. | 600/517 |
| 2010/0085152 A1 * | 4/2010 | Fukuda et al. | 340/5.82 |
| 2012/0011579 A1 * | 1/2012 | Niinuma | 726/9 |
| 2012/0185397 A1 * | 7/2012 | Levovitz | 705/71 |
| 2013/0133049 A1 * | 5/2013 | Peirce | 726/6 |
| 2013/0219193 A1 * | 8/2013 | Baughman et al. | 713/193 |
| 2013/0225129 A1 * | 8/2013 | Norbisrath et al. | 455/411 |

\* cited by examiner

*Primary Examiner* — Peter Poltorak

(57) ABSTRACT

An approach for enabling multi-factor biometric authentication of a user based on different data capture modalities of a mobile device is described. A biometric enabler receives a request for authentication of a user via a network at a mobile device of the user. The biometric authentication further initiates a capture of media associated with the user at the mobile device based on the request, wherein the capture is based on a capture condition. The biometric enabler also determines, in response to the request, whether the media is associated with different types of biometric information of the user as maintained in association with a resource that requires authentication of the user.

18 Claims, 16 Drawing Sheets

100

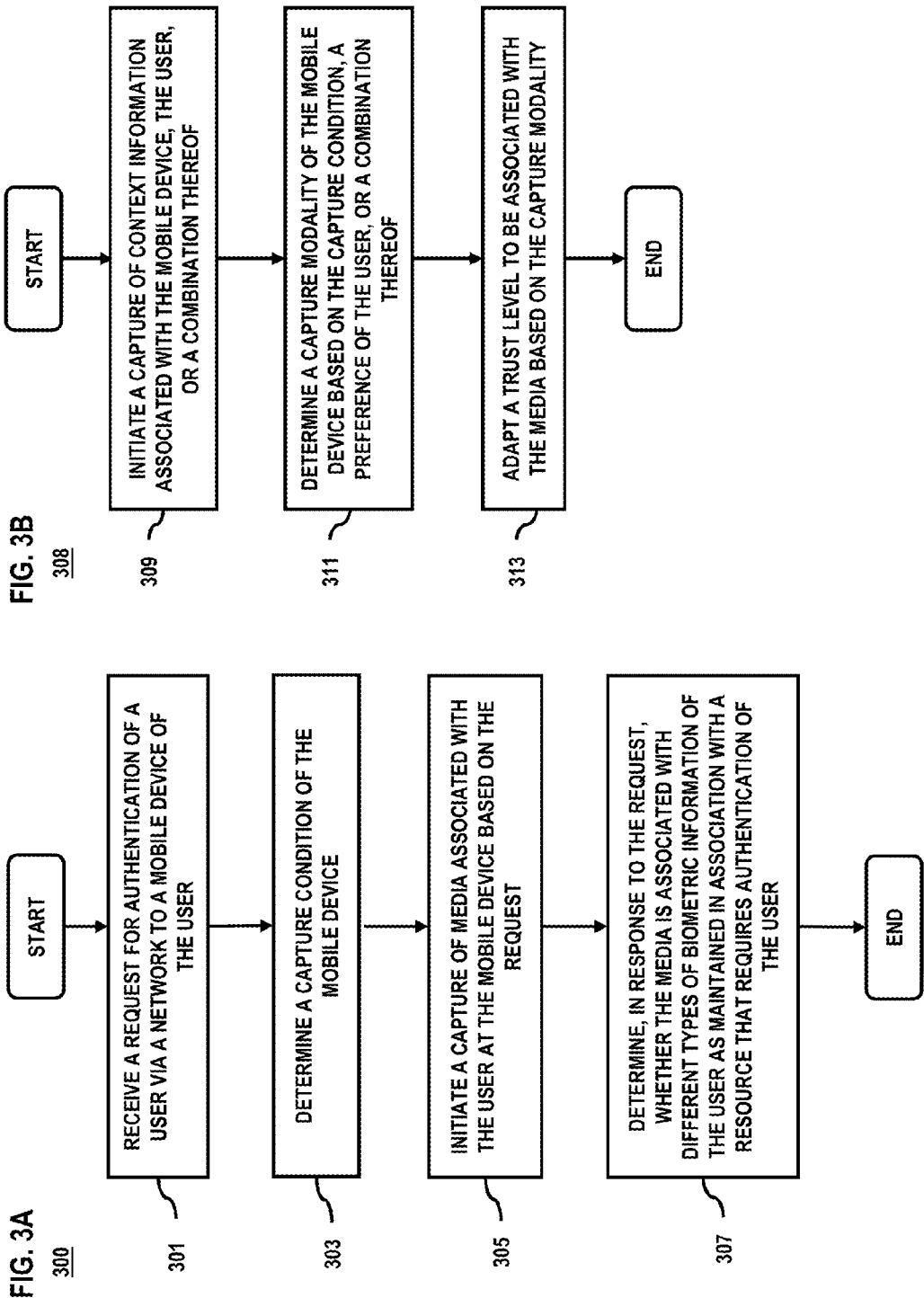

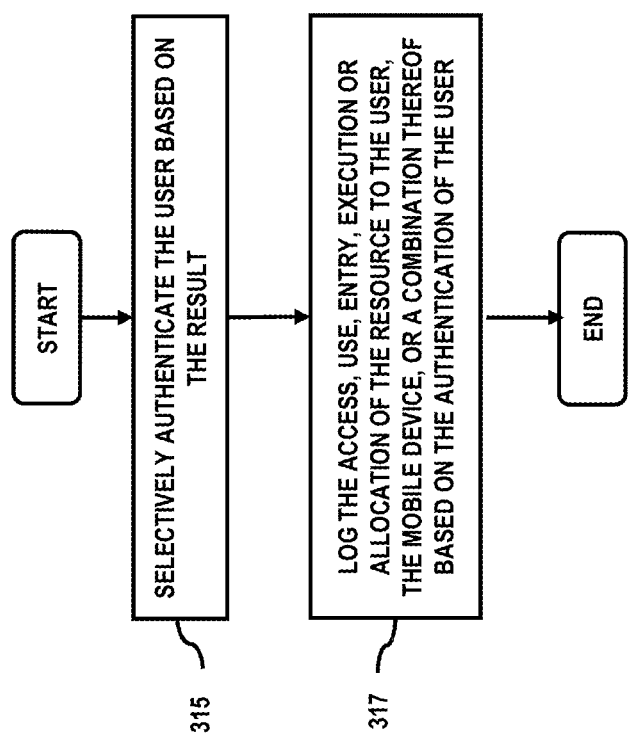

US 9,100,825 B2

METHOD AND SYSTEM FOR MULTI-FACTOR BIOMETRIC AUTHENTICATION BASED ON DIFFERENT DEVICE CAPTURE MODALITIES

RELATED APPLICATIONS

This application is a Continuation in Part of U.S. patent application Ser. No. 13/407,079 filed Feb. 28, 2012 entitled "Method and System for Multi-Factor Biometric Authentication," which is incorporated herein by reference in its entirety.

BACKGROUND INFORMATION

Service providers are continually challenged to deliver value and convenience to consumers by providing compelling network services and advancing the underlying technologies. One area of interest has been the development of security services—e.g., for performing strong authentication of mobile device users based on the capture and analysis of biometric data. Unfortunately, users are limited in their ability to control or enhance their experience as they submit media, such as voice or video data, required for performing the authentication.

Based on the foregoing, there is a need for enabling multi-factor biometric authentication of a user based on different data capture modalities of a mobile device.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A-3C are flowcharts of processes for enabling multi-factor biometric authentication of a user based on different data capture modalities of a mobile device, according to various embodiments;

DESCRIPTION OF THE PREFERRED EMBODIMENT

An apparatus, method and software for enabling multi-factor biometric authentication of a user of a mobile device are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form to avoid unnecessarily obscuring the present invention.

Figure 1:
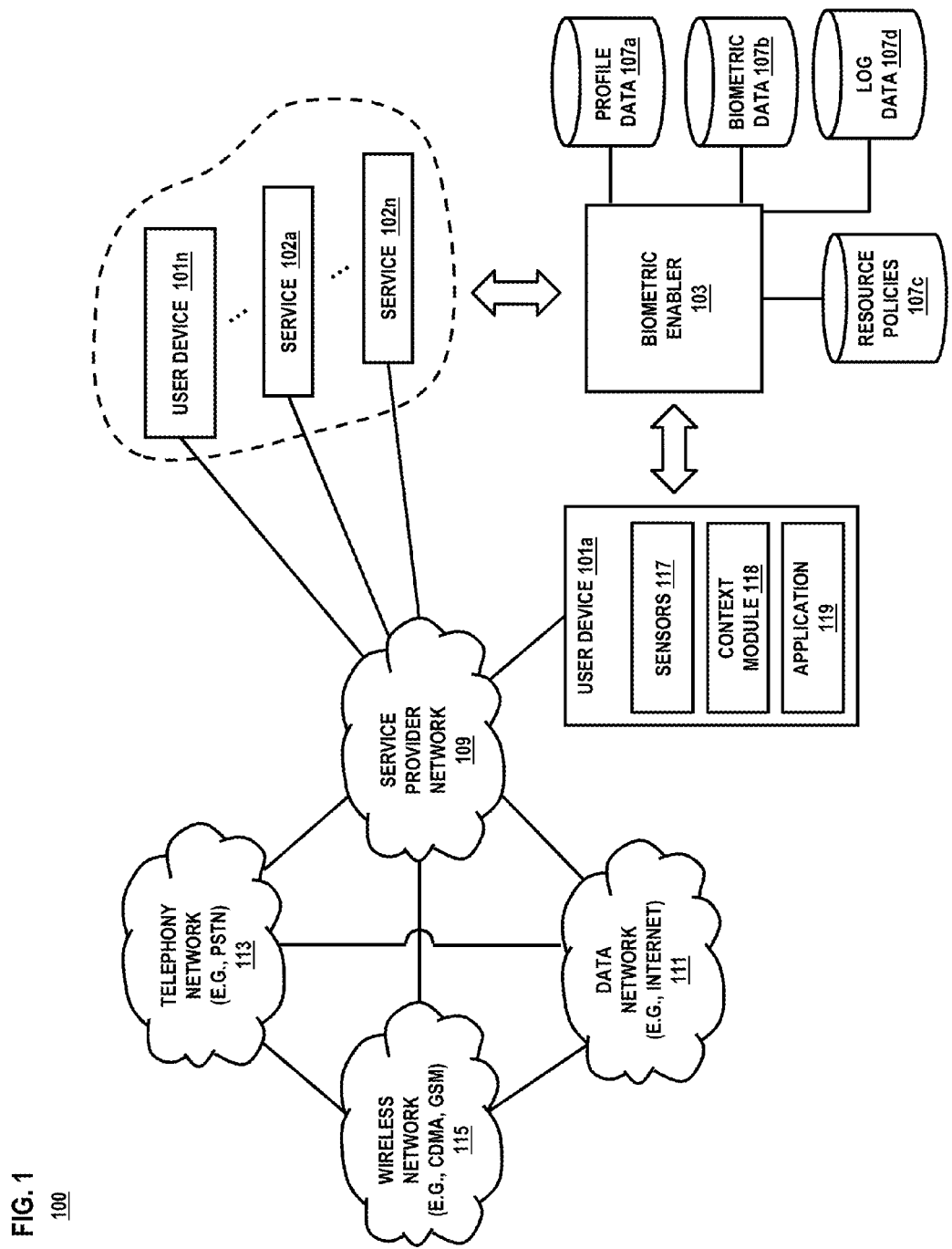
FIG. 1 is a diagram of a system for enabling multi-factor biometric authentication of a user of a mobile device, according to one embodiment.

FIG. 1 is a diagram of a system for enabling multi-factor biometric authentication of a user of a mobile device, according to one embodiment. In certain embodiments, the system 100 facilitates the gathering, exchange and processing of multiple different types of biometric data pertaining to the user for enabling resource allocation, access, use and/or entry. In addition, the system 100 enables one or more preferences to be established for influencing how the user interacts with system 100 in response to an authentication request.

Resources subject to or associated with the authentication procedure may involve a user device 101a-101n (e.g., a server, workstation, mobile device, tablet, wearable computer, data store). Other resources may include an application or service 102 (e.g., web service), a security system of a facility (e.g., building, automated teller machine (ATM)), or the like. The procedure supports user controlled multi-factor biometric authentication, wherein multiple different biometric data types are relied upon for fulfilling an authentication scheme.

For the purpose of explanation, biometric authentication pertains to methods for granting access, use, allocation and/or entry to a resource based on the authentication of intrinsic physical or behavioral traits of a person (user) of interest. Biometric identifiers/traits include the distinctive, measurable physiological and/or behavioral characteristics of the user that enable the repeat distinguishing of one user from another. Physiological characteristics are related to the user's body and may include fingerprint data, facial data, vein data, ear data, iris data, voice physiology, hand geometry, retinal geometry or odor/scent information. Behavioral characteristics are related to the behavior of the user, including but not limited to, typing rhythm, gait and voice data (e.g., a voice print, inflection patterns, speech patterns).

Traditionally, various applications employ the use of voice recognition or face recognition technology as a means of distinguishing the unique characteristics of different users. However, conventional systems do not enable the user to adapt how they view themselves as they convey media representative of their voice or face during the recognition procedure. For example, in the case where a user is uncomfortable viewing themselves in the camera while video data is being acquired for authentication purposes, the user has no recourse. As another example, in the case where environmental factors such as low lighting conditions or noise impede the effectiveness of media capture, the user cannot readily affect operation of the device to better facilitate the capture. Resultantly, the user experience when performing biometric authentication is diminished due to lack of user flexibility.

To address this issue, a biometric enabler 103 is configured to operate in connection with the user device 101a (e.g., a mobile device) and/or various resources to permit the gathering and processing of multiple different types of biometric data. This can include, for example, the gathering of media in the form of voice data (representing the user's utterance or voice characteristics) concurrent with the gathering of video data of the user's facial characteristics. Also, other forms of media to be analyzed as biometric data, including iris data, retinal data, vein data, and fingerprint data, may also be gathered and processed. Hence, the biometric enabler 103 enables multiple different biometric factors to be captured and analyzed for correlating a user's facial expressions coupled with the user's speech/vocal expressions.

Still further, the biometric enabler 103 is configured to cause execution of one or more modalities of the user device 101a for affecting the gathering procedure. This may include adapting a view of the biometric data being captured as presented to the user while they interact with the user device 101a. This may include, for example, presenting only a partial view of the user's face rather than a full view as the user faces a camera sensor (e.g., sensor 117). Still further, the modality may correspond to a mode of operation of the user device 101a as experienced by the user at the moment of capture. For example, this may include executing a voice-only mode of operation for gathering of the biometric data or adapting the device for low light conditions. As will be discussed further later on herein, the biometric enabler 103 may process one or more user preferences for affecting operation of the sensors 117, the user device 101a that gathers the data, or a combination thereof.

In certain embodiments, media such as video or audio data is gathered in connection with an authentication procedure of the biometric enabler 103, i.e., for biometric analysis. The authentication procedure may be performed in response to a request for biometric authentication of the user as transmitted by services 102a-102n via a network (e.g., service provider network 109). The services 102a-102n, referred to collectively herein as services 102, may include any applications, tasks or procedures for performing a transaction in association with the user device 101a by way of the network. Alternatively, the biometric enabler 103 performs the authentication in response to a non-network initiated events, such as in the case the authentication request is invoked directly by the user. Invocation of the request may be due to an accessing of the service 102 by the user from the user device 101.

By way of example, the services 102 may include an online banking service for performing a banking transaction, a social networking service for performing a social networking transaction, a network access service for remotely accessing a private network, a security service for accessing a facility or any other service where user authentication is required. Still further, the authentication procedure may be initiated by another user device 101n, such as in the case where the user device 101n executes a remote access procedure. The authentication procedure may be defined according to instructions and protocols established by the facilitator and/or provider of the various resources (e.g., services 102) to be allocated, accessed, used or entered. Such protocols are set forth via one or more resource policies 107c. The resource policies 107c may define the access rights and privileges of various users and/or user device 101a for accessing a resource, the one or more authentication protocols and procedures to be carried out (e.g., the required set of authentication questions to be answered and/or responded to by the user), contextual conditions to be fulfilled, etc. In addition, the resource policies 107c may define the order of execution of one or more authentication procedures to be performed with respect to a given resource.

In certain embodiments, the biometric enabler 103 employs sensors of a user device 101a to facilitate the gathering of media representative of the voice and facial characteristics of the user. By way of example, the user device 101 may include a mobile device of the user that is equipped with a video recorder, audio recorder or the like for acquiring voice and/or video data associated with the user. The request for authentication may be conveyed to the user device 101 as a message or prompt for the user to verbally and physically respond to various questions, commands and/or tasks for fulfilling the authentication procedure. The response provided by the user is captured by the sensors 117 of the device 101a, for compiling a set of voice, video or other data (e.g., still image data by way of an infrared light source), referred to herein as a response input. User conveyance of the response input may be captured in connection with a specified modality of the user device 101a.

For example, the authentication request may be presented to a user interface of the user device 101 as a prompt/instruction to utter a word, a phrase, a series of digits from 0-9 (or specifically the entire range of digits from 0-9), a specific term, etc. As another example, the user may be prompted to alter the angle of capture or orientation of the camera/user device 101 as they recite a specific phrase or security code. As the user executes these actions, a capture modality may be employed for limiting and/or adapting the presentment of feedback information—i.e., an image of the user as they perform the action. This may include, for example, presenting only a portion of the user's face as feedback to the display of the user device while they speak into the camera. As yet another example, the user may be required to recite a knowledge-based authentication "challenge" (e.g., recite their employee user identifier), while only their mouth is presented to the display of the user device. By virtue of gathering multiple types of data related to the user in multiple ways, the authentication procedure is performed in a manner similar to a video chat session, wherein the user looks into the camera sensor while simultaneously speaking into the microphone sensor of the user device 101a. Still further, limiting the view of the user as they perform the requested authentication task may accommodate those users that wish not to view their entire face.

In certain embodiments, the biometric enabler 103 supports the execution of various media capture modalities of the user device 101a in connection with the authentication request. As mentioned previously, the media capture modalities correspond to one or more user preferences for affecting the user experience as they provide a response input to the authentication request. The preferred modality of the user may be specified via profile data 107a maintained in connection with the user. Alternatively, the media capture modalities may be defined by, or developed in conjunction with, the provider of the resource (e.g., service 102) for accommodating different authentication schemes. Still further, the biometric enabler 103 may accommodate on demand execution of a given modality by a user.

In one embodiment, a periocular modality of the user device 101a may be initiated by the biometric enabler 103. Under this scenario, the camera sensor 117 of the user device is configured to focus narrowly on the eyes of the user during the authentication procedure as opposed to the entire face. As such, the zoom level, viewing scope or other attributes of the camera are adapted for concentration on a limited area of the face. During the authentication procedure, the verbal instruction to be recited by the user may be rendered textually to the display along with a view of only the area around the user's eyes. Similarly, in another embodiment, a partial view modality may also be performed in similar fashion, wherein a particular feature of the user's face is the point of focus of the camera. This may include, for example, a mouth view, a single eye view, a nose view, an ear view, etc. Under this scenario, for example, during the authentication procedure, the user may be presented with a view of the eyes along with a view of their mouth, but not their entire face.

In another embodiment, an alternate image modality of the user device 101a may also be initiated by the biometric enabler 103. Per this modality, instead of being presented with a view of their face during the authentication procedure via the user device 101a, the user is presented with an avatar, icon or other image. For example, per the user preferences, the image may be of a favorite celebrity or a preferred social networking avatar of the user as opposed to their face. As another example, the user could be presented a view based on ultrasound, infrared and/or a computer generation of their likeness. Still further, the camera may be configured to generate a blurred, silhouette, outline or other adapted view of the user's face. It is noted that any image for providing visual feedback to the user as an alternative to their face may be suitable for accommodating those who prefer not to view themselves.

Still further, an augmented reality modality of the biometric enabler 103 may operate in connection with the user device 101a to support an augmented reality view of the user. Under this scenario, the augmented reality modality may support execution of an application 119 or service 102 that enables the display of augmented reality objects at the device 101.

In one embodiment, a low lighting modality of the user device 101a may also be initiated by the biometric enabler 103. The low lighting modality may be activated in response to the detection of low light conditions of the user device 101a (e.g., via mobile device light sensors). Per this modality, the user device 101 may detect the user's face using the light from the display/screen of the user device 101a, the camera flash, a ultra-violet or infrared light source, etc. The device may be operated in a flashlight mode, wherein the device is caused to emit a high intensity white light for illuminating the face of the user as they face the screen/camera. During this mode, the specific commands and/or questions pursuant to the authentication procedure may still be rendered to the screen as black colored characters/lettering or another contrasting color. It is noted that the view presented to the user during this modality may correspond to an outline of the user's face, i.e., as represented by one or more dashed lines corresponding to the features/orientation of the face. Furthermore, the low-light modality may be performed concurrent with the previously described modalities (e.g., periocular modality).

In another embodiment, the biometric enabler 103 may initiate a noise enhancing modality of the user device 101. Per this modality, the biometric enabler 103 enables the sensors 117 (e.g., microphones) of the user device 101 to detect and cancel ambient noise. As such, the voice related media as captured for performing the biometric authentication procedure can be more reliably processed. Any known means of noise cancellation, noise reduction or the like may be performed in connection with the biometric enabler 103.

In one embodiment, one or more of the above described modalities may be automatically executed, such as in response to the detection of one or more predetermined contextual conditions. The contextual conditions may be determined as a result of the processing of context information associated with the user device 101a, such as location, lighting, noise, temporal, or device usage history information. For example, in the case where it is historically determined that the user preference is for a periocular modality to be selected and/or used, this data may be correlated with perceived ease of use analysis/metrics for determining future modalities to permit or prevent in response to an authentication request. As another example, when sub-optimal conditions exist (e.g., low light, high noise), the biometric enabler 103 may default to one or more of the following:

Low Light Condition:
1. Perform voice biometric only
2. Perform multiple voice biometrics, e.g., multiple challenges, requesting something user knows (e.g., zip code), etc.

High Noise Condition:
1. Implement noise cancelation
2. Perform face biometrics only
3. Perform multiple face biometrics from single user interaction (e.g., face, periocular, eyebrow, iris, lips, etc.).
4. Perform multiple face biometrics from multiple user interactions When operating in sub-optimal conditions, as detected via a context module 118 of the user device 101a, the biometric enabler 103 may generate attenuated/reduced level-of-trust confidence scores for the determined authentication result. If, for example, voice-only authentication is performed, a lower trust level confidence score may be assigned to the result. This is in contrast to a scenario wherein both voice and face based authentication was performed simultaneously to render an authentication result.

In one embodiment, the biometric enabler 103 analyzes the media captured in response to the request according to various data recognition techniques. For example, the biometric enabler 103 employs image, facial and voice recognition techniques for correlating the media provided as response input with the baseline biometric data 107b as gathered during an enrollment procedure. The enrollment procedure is described more fully later on herein. It is further contemplated that the recognition may be performed in connection with specific pattern and motion recognition techniques for enabling the biometric enabler 103 to identify various bodily gestures and motions unique to the user. The authentication may therefore be predicated upon analysis of voice and facial characteristics of the user in conjunction with a predetermined motion or gesture (e.g., a secret facial expression or a specific sequence of facial features).

For the purposes of illustration, the analysis (e.g., recognition and matching) performed by the biometric enabler 103 may be based on the biometric data for the user. By way of example, when the biometric data provided as response input during authentication is captured, specific portions of the collected data may be compared to biometric data 107b captured during enrollment of said user. Alternatively, the entire captured response may be subject to comparison. Any approach or processing technique is within the scope of the exemplary embodiments presented herein. Furthermore, it is noted that the biometric enabler 103 may support parallel and/or distributed processing of collected data for rendering an authentication result. For example, a basic processing (e.g., general determination that the data corresponds to a face versus another part of the body) of the collected data may be analyzed via the biometric enabler 103 at the device, while more complex analysis is performed by a network accessible service/module of the biometric enabler 103.

Still further, the user device 101 may perform initial coarse grain biometric authentication confidence score generation. Under this scenario, the biometric data is forked to a network to one or more processing resources, e.g., service provider 109, where fine grained biometric authentication confidence scores are generated. By way of example, a HTML5 browser session on the user device 101 uses the camera and microphone to gather biometric data then forks this data for concurrent local and external processing. Local processing on user device 101 generates coarse biometric authentication scores, e.g., based on coarse face (e.g., limited number of points measured a limited number of times), iris and voice data. Concurrently, the forked video and audio data is used, along with additional context information, to progressively generate fine grain biometric authentication scores based on fine face (e.g., several points measured several times), vein and voice data, using large scale computing resources, e.g., in service provider network 109. An application 119 then uses the coarse and fine grained biometric authentication confidence scores to progressively calculate combined confidence for evaluating user authorization decisions. It is noted that the biometric enabler 103 may be configured to accommodate different processing arrangements accordingly.

The above described approaches and techniques enable the biometric enabler 103 to determine an authentication result. For example, when the response input is found to match the baseline biometric data 107b for the user to within a predetermined threshold, the authentication procedure is flagged as being complete/fulfilled by the user. Resultantly, the user is able to perform and/or carry out the transaction for which the authentication was required. Alternatively, the biometric enabler 103 can return a biometric authentication confidence score (e.g., 90% confidence) to the requesting service 102 and allow the service 102 to judge the biometric authentication result (e.g., pass or fail). When no match is determined, however, the authentication procedure is flagged as incomplete/unfulfilled. Consequently, access to, allocation of, use of, or entry to the resource associated with the multi-factor biometric authentication procedure is restricted to the user.

In certain embodiments, the authentication result may be dependent on the processing of context information 107a conveyed to the biometric enabler 103 at the moment of response input data capture. The context information may include, for example, location information, temporal information, network information, position information and other data collected by a context module 118 of a device 101a. The context module 118 conveys this information to the biometric enabler 103. Under this scenario, authentication may include validating a location condition, time condition, or other factor in addition to the biometric analysis. Additionally or alternatively, external sensor (e.g., video surveillance camera in the user's environment) information may be used by context module 118. Conditional requirements may be specified per the resource policies 107c defined for the resource in question, the profile data 107a of the user, or a combination thereof.

By way of example, a time condition may need to be fulfilled to permit the fulfillment of a wire transfer via an online banking service. In this case, the biometric enabler 103 accesses various resource policies 107c for supporting interaction between the user, the user device 101a and the online service provider. The user device 101a may include, for example, a dedicated application 119 for enabling communication exchange between the user device 101a and the service 102. Alternatively, the application 119 may be a browser application 119 or other portal through which the various authentication questions, tasks and/or commands required for fulfillment of the banking transaction are presented.

A first user may have twenty-four hour access to the service for conducting wire transfers by virtue of access rights afforded them by the service provider (e.g., based on resource policies 107c). The authentication of the user's biometric data, which includes voice and facial expressions, thus permits the service 102 to open at any time of the day. In contrast, a second user may only be granted the ability to perform wire transfers during normal business hours of the service provider. As a result, successful processing of the biometric data during authentication is not sufficient in and of itself to permit execution of the transaction when the current time is beyond business hours.

As another example, a just-in-time (JIT) authentication procedure may be carried out based on the fulfillment of one or more conditions being met per the resource policies 107a. JIT authentication may include, for example, triggering of the authentication procedure only when a specified contextual condition is determined. For instance, when it is determined a user is attempting to access a device 101n (or device 101a) for performing a low-priority transaction, the biometric enabler 103 may allow the user to bypass some steps of the authentication procedure. In contrast, when it is determined the user is attempting to perform a high-priority transaction (e.g., a financial transaction), the biometric enabler 103 may prompt the user to proceed with the authentication instructions, commands and/or questions. In this example, the determined priority level of the transaction, the type of activity being performed and/or the type of resource triggers the authentication procedure in time for enabling access, use, allocation or entry of the resource accordingly. It is noted that the context information 107a as gathered via the context module 118 may also include activity and/or transaction information related to the user, the user device 101a, or a combination thereof. Context data 107a can be stored on the user device 101a, in a service provider network 109, or a combination of both.

In yet another example, the biometric enabler 103 may be configured to perform continual authentication of a user in connection with a resource. Continual authentication may include, for example, triggering of subsequent authentication procedures beyond initial authentication of the user. By way of example, a user granted access to a proprietary server after successful completion of an initial authentication may be required to perform the authentication procedure every x minutes thereafter. Under this scenario, access to the resource is revoked or interrupted unless the subsequent authentication procedure is carried out. Per this approach, the subsequent authentication procedures may still be performed according to the above described modalities, i.e., periocular, alternative image, voice only.

Still further, the subsequent authentication procedure may be the same as the initial authentication procedure, thus requiring the user to provide the same biometric data as a response input. Alternatively, the user may be required to execute different questions, tasks and/or commands for capturing of biometric data. Thus, for the latter, the user is prompted to provide a different security passcode, challenge phrase, or identifier for attaining successively higher levels of authentication with respect to a resource. User biometric data processing can also be performed passively. For example, voice and facial biometric data may be captured as the user speaks during a video chat on their mobile phone.

It is noted, therefore, that the request for authentication of the user may be based on multiple forms of media (e.g., voice, image, video) being captured simultaneously for subsequent analysis. By facilitating the capture of various facial gestures, mannerisms and expressions in association with data for indicating user voice inflection, intonation, sound, rhythmic patterns, etc., the data recognition accuracy of the biometric enabler 103 is enhanced. Furthermore, the level of security associated with the authentication process is enhanced as more finely tuned, distinct media types are required to perform the recognition process for enabling authentication. This is in contrast to performing recognition based on a static image of the user's face, which does not fully account for the different characteristics, mannerisms or conditional factors that enhance biometric authentication.

In certain embodiments, the biometric enabler 103 may also support the execution of an enrollment procedure. The enrollment procedure allows users to generate baseline biometric data for use in connection with a service, i.e., during registration for the service 102 by the user. This biometric data 107b is utilized as a basis for subsequent analysis of the media captured in response to the authentication request; to determine if the captured media (e.g., video or voice data) sufficiently matches the biometric data and therefore fulfills the authentication request in association with the user. Hence, the biometric enabler 103 facilitates the capture and subsequent analysis of the media representative of the user, wherein the analysis includes comparing the voice data, video data, etc., or a combination thereof against the previously acquired biometric data for the user. It is noted that the enrollment procedure, as described herein, must be performed in advance of a request for authentication of the user by a service 102. In addition, the biometric data 107b may be stored in association with a user profile 107a and/or resource policy file 107c for defining how a given resource, such as the service 102, interacts with the user device 101 to perform the authentication.

For the purpose of illustration herein, biometric data 107b may include a combination of specific data points for uniquely identifying a user's physical, physiological, and/or behavioral characteristics. The biometric data may be equivalent to any captured voice, face, fingerprint, iris, retinal, vein, and other data collected in relation to a particular user. Alternatively, the biometric data include only a subset of the collected data, the subset representing data for indicating only specific points of distinction for a given subject (e.g., a user).

The enrollment procedure may include, for example, one or more instructions to be carried out by the user involving the capture of physical, physiological and behavioral characteristics. In certain embodiments, the user performs enrollment during an initial registration process with the biometric enabler 103, the service 102 or at a later time. In other instances, enrollment may be performed on demand, such as to accommodate different resource access or authentication schemes. It is noted, depending on the authentication scheme, that the enrollment process can be prompted by the resource to be accessed or activated by the user directly (e.g., via a user interface for interacting with the biometric enabler 103). Alternatively, the biometric enabler 103 may prompt the user to execute enrollment upon determining no existing or up-to-date biometric data 107b is available, or a greater level of authentication/authorization is required for the user.

Any device having the required external and/or internal sensors 117—e.g., camera and microphone—can be employed by the biometric enabler 103 to conduct enrollment. Under this scenario, enrollment is performed via the user device 101a or a different user device, such as the user's desktop computer, network camera, or a workstation featuring camera/video capture and audio capture capabilities. By virtue of gathering multiple types of data related to the user, enrollment is performed in a manner similar to a video chat session wherein the user looks into the camera while speaking into the microphone. The enrollment procedure may correspond to a set of default instructions and protocols, or be defined according to instructions and protocols established by the facilitator and/or provider of the various resources/services 102 to be allocated, accessed, used and/or entered. Such instructions and protocols are defined by way of one or more resource policies 107c.

As noted previously, the biometric data 107b captured by way of the multi-factor enrollment process described above may be stored in connection with profile data 107a for the user. Per this approach, the biometric data for the user serves as a biometric signature, profile, fingerprint, etc., for enabling subsequent reference and/or identification of the user for authentication purposes. It is noted that the biometric data 107b includes face and voice biometric baseline data as well as corresponding movement data related to the user; thus supporting multi-factor authentication.

In certain embodiments, the biometric enabler 103 may be offered by a service provider as a managed or hosted solution (e.g., as a cloud based service), as an integrated component of the user device 101a, or a combination thereof. By way of example, the user device 101a may interact with the biometric enabler 103 via a network 109. Under this scenario, the various data processing, recognition and biometric analysis functions described herein are performed independent of the device 101a. Resultantly, any sensor data and context information gathered by the device via sensors 117 or context module 118 is transmitted to the biometric enabler 103. Results from processing of the data are then returned/pushed back the user device 101a.

In the case of direct integration of the biometric enabler 103, the various data processing, recognition and biometric analysis functions described herein are performed at the device 101a. For example, the biometric enabler 103 may be implemented in a chip set, with specific input/output sequences for use in connection with the operating system of the device, the application 119, or a combination thereof. Under this scenario, the biometric enabler 103 directly controls the operation of the sensors 117 and context module 118 for receiving voice, face and context related data. In certain embodiments, the biometric enabler 103 may also distribute the processing, such that certain tasks are performed at the device 101a while others are performed via a hosted solution.

It is noted that user devices 101a-101n may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), wearable computer, smartphone or any combination thereof. It is also contemplated that the user devices 101a-101n can support any type of interface for supporting the presentment or exchange of data. In addition, user devices 101a-101n may facilitate various input means for receiving and generating information, including touch screen capability, keyboard and keypad data entry, video, gesture recognition, voice-based input mechanisms and the like. Any known and future implementations of user devices 101 are applicable.

It is also noted, with respect to FIG. 1, that user device 101n can be a server, workstation, desktop computer, security system, ATM, kiosk, wireless node, network adapter, or any other standalone or integrated system comprising a collection of resources. In this scenario, a resource in the form of a user device 101n is different in arrangement and/or configuration than user device 101a, and therefore may not include the various components 117 and 118 as employed via user device 101a. The user device 101n may also not feature an application 119.

In certain embodiments, user device 101a, the biometric enabler 103, resources and other elements of system 100 may be configured to communicate via a service provider network 109. According to certain embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network.

Networks 109-115 may employ various technologies for enabling wireless communication including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Still further, the communication provider network may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, the communication networks 109-115 may support, embody or include portions of a signaling system 7 (SS7) network, Internet protocol multimedia subsystem (IMS), or other suitable infrastructure to support control and signaling functions.

It is noted, though not shown in the figure, that in certain embodiments user devices 101a-101n may be configured to establish peer-to-peer communication sessions with each other using a variety of technologies—near field communication (NFC), Bluetooth, ZigBee, Z-Wave, infrared, etc. Also, connectivity can be provided via a wireless local area network (LAN). By way of example, a group of user devices 101a-101n may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101, i.e., IP addresses that are accessible to devices connected to the service provider network 109 as facilitated via a router. Network address translation (NAT) can also be used to protect the details and configuration of the underlying network topology from becoming known.

Figure 2:
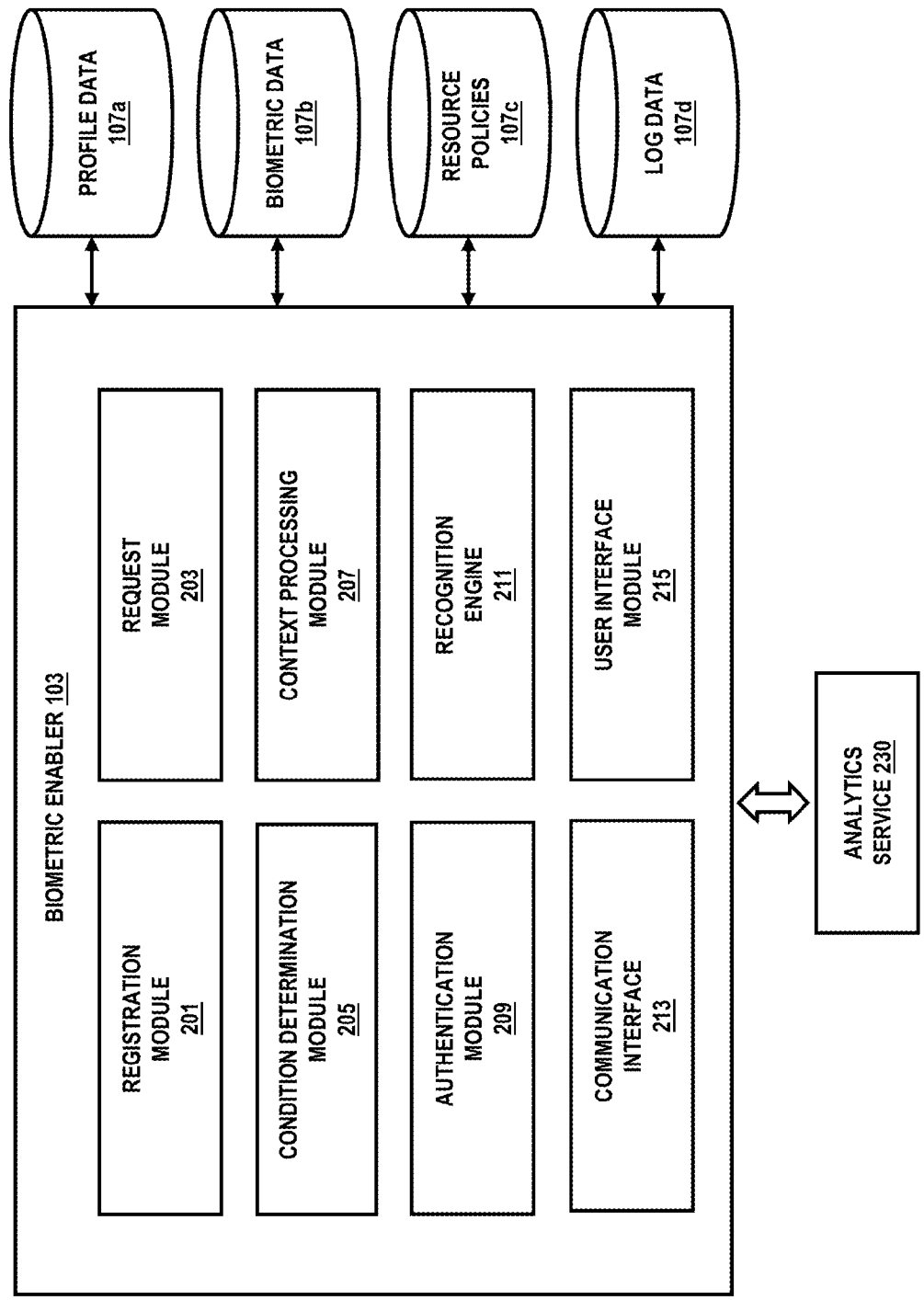
FIG. 2 is a diagram of the components of a biometric enabler, according to one embodiment.

FIG. 2 is a diagram of a biometric enabler, according to one embodiment. The biometric enabler 103 includes various executable modules for performing one or more computing, data processing and network based instructions that in combination provide a means of enabling multi-factor biometric authentication of a user of a mobile device. Such modules can be implemented in hardware, firmware, software, or a combination thereof. By way of example, the biometric enabler 103 may include a registration module 201, a request module 203, a condition determination module 205, a context processing module 207, an authentication module 209, a recognition engine 211, a communication interface 213 and a user interface module 215.

In addition, the biometric enabler 103 also maintains various databases for storing profile information 107a pertaining to users, biometric data 107b as generated for users, resource policies 107c and log data 107d pertaining to users (or optionally resource providers). It is noted that modules 201-215 access several of these databases for performing their respective functions.

In one embodiment, a registration module 201 registers users and user devices 101a (e.g., a mobile device) for interaction with the biometric enabler 103. By way of example, the registration module 201 receives a request to subscribe to the biometric enabler 103 for enabling multi-factor biometric authentication of a subscribing user. The subscription process may include the generating of enrollment data for use in creating biometric data 107b. The registration may be performed by way of a user interface generated by the user interface module 215. In addition, the registration process may include the selection of various resources the user wants access to. The resources are themselves registered with the biometric enabler 103 and specified by one or more resource policies 107c. As noted, the resource policies 107c also indicate various access rights for a particular user with respect to the resources. Preferences and settings information may be referenced to a specific user, user device, or combination thereof and maintained in connection with profile data 107a.

The registration process performed by the module 201 may also include receiving and validating a login name and/or user identification value as provided or established for a particular user during a subscription/registration process with the provider of the biometric enabler 103. The login name and/or user identifier value may be received as input provided by the user from the user device 101 or other device via a graphical user interface to the biometric enabler 103 (e.g., as enabled by the user interface module 215). Profile data 107a for respective subscribers, which contains pertinent user or device profile data, may be cross referenced as part of the login or access process. Alternatively, the login process may be performed through automated association of profile settings maintained as profile data 107a with an IP address, a carrier detection signal of a user device, mobile directory number (MDN), subscriber identity module (SIM) (e.g., of a SIM card), radio frequency identifier (RFID) tag or other identifier.

In one embodiment, the request module 203 renders a message to a display of the user device 101 for instructing the user to respond to one or more questions, commands or tasks required for biometric authentication. By way of example, the request module 203 receives a notification and/or a request for authentication of the user from a resource via a network, i.e., as a network based request. Under this scenario, the resource submits the request, such as in response to an attempt by the user of the device to access the resource. As another example, the request module 203 may initiate the authentication procedure in response to a non-network based request. This may correspond to the case where the user initiates access to a network based application 119 directly from the user device 101a.

In one embodiment, the condition determination module 205 operates in connection with the request module 203 and context processing module 207 to determine whether a capture condition of the user device is fulfilled. The condition determination module 205 influences the modality, behavior, operation or performance of the user device during capture of the biometric information related to the user. Under this scenario, the condition determination module 205 is invoked in response to receipt of an authentication request via the request module 203, i.e., a network based request. The condition determination module 205 may access profile data 107a related to the user or the user device 101 to identify any user specified preferences or capture conditions. Capture conditions may include, for example, a lighting condition, sound condition or any other environmental condition associated with the user or the user device 101.

Alternatively, the capture condition may be related to an execution preference of the user device as specified via the profile data 107a. The profile data 107a may indicate a preferred authentication execution preference of the user, including a capture modality. For the purpose of illustration, this may include a periocular modality, a partial view modality, an alternate image modality, a voice only modality, etc. As another example, the capture condition may relate to an augmented reality modality of the user device, a no-camera modality, or the like.

In one embodiment, the context processing module 207 may operate in connection with the condition determination module 205 to gather and subsequently analyze sensor information. The data is processed according to the sensor type—i.e., if the sensor is a network detection sensor, it processes and interprets the network data (e.g., internet protocol address information). Likewise, if the sensor is a global positioning sensor, the module 207 interprets the gathered data as location and/or geo-spatial data. Still further, a light sensor or sound sensor detects light and sound data.

In one embodiment, the recognition engine 211 employs various data recognition techniques for analyzing biometric data. This includes, for example, voice recognition, image and video recognition, iris recognition, vein recognition, motion analysis and the like. The recognition engine 211 also employs facial characteristic analysis. Any known and still developing protocols and algorithms may be employed. The recognition engine 211 processes the data in order to determine a correlation with known biometric data 107b pertaining to the user (e.g., as generated via an enrollment procedure).

It is contemplated in certain embodiments that the aforementioned recognition approaches may be used in combination for interpreting the multiple different types of biometric data. It is further contemplated that the motion recognition techniques may be employed for determining user fulfillment of a predetermined motion or gesture (e.g., a secret facial expression or a specific sequence of facial features), as a "live-ness test" (e.g., to prevent pre-recorded data from being used), or various user mannerisms.

In one embodiment, the authentication module 209 may be configured to perform online and/or offline processing of media representative of biometric data as provided by a user for performing biometric analysis. The media may include that provided by the user in response to a prompting by the request module 203. For example, in certain implementations, the authentication module 209 may perform analysis of the media against known baseline biometric data 107b in conjunction with the recognition engine 211 at the device 101. Concurrent with this execution, more advanced or refined analysis may be performed via a remote analytics service 230 that is accessed via the communication interface 213. Under this scenario, the analytics service 230 processes the response input (e.g., face and voice related media) using various advanced algorithms then returns the processing result to the authentication module 209. The various instructions and protocols defining the authentication procedure are processed by the authentication module 209 via one or more resource policies 107c.

Still further, the authentication module 209 may perform transaction logging, wherein the results of the authentication request or the authentication procedure are recorded. For example, in the case where the user provided voice input to a request for voice-only biometric authentication is successfully performed, this result is maintained as log data 107d. The time and date of authentication, relevant network information, user related information, etc., may also be recorded. It is noted that logging of such transactions may support future data inquiry needs, including the resolving of information sharing/privacy disputes, non-repudiation issues, identity theft disputes or the like.

In one embodiment the user interface module 215 enables presentment of a graphical user interface for prompting the user to provide input for performing the authentication. By way of example, the user interface module 215 generates one or more graphics primitives to the interface in response to application programming interfaces (APIs) or other function calls initiated pursuant to a request. It is noted that the user interface module 215 may coincide with a browser application, dedicated application, or other interface based software operable at a user device subject to the authentication procedure.

In one embodiment, a communication interface 213 enables formation of a session over a network 109 between the biometric enabler 103 and the resources (e.g., services 102). By way of example, the communication interface 213 executes various protocols and data sharing techniques for enabling collaborative execution between a subscriber's user device 101 (e.g., mobile devices, laptops, smartphones, tablet computers, desktop computers, wearable computers, servers, workstations) and the biometric enabler 103 over the network 109. It is noted that the communication interface 213 is also configured to support a browser session—i.e., the retrieval of content as referenced by a resource identifier during a specific period of time or usage of the browser.

The above presented modules and components of the biometric enabler 103 can be implemented in hardware, firmware, software, or a combination thereof. Though depicted as a separate entity in FIG. 1, it is contemplated that the biometric enabler 103 may be implemented for direct operation by respective user devices 101a-101n. As such, the biometric enabler 103 may generate direct signal inputs by way of the operating system of the user device for interacting with the resources or the application 119. In another embodiment, one or more of the modules 201-215 may be implemented for operation by respective user devices as a platform, hosted solution, cloud based service, or the like. Under this scenario, a biometric enabler-as-a-service access model may be employed, such as in connection with a mobile device module, a software development kit (SDK) and corresponding Service Provider Network processing scheme. As such, various application developers may incorporate multi-factor biometric authentication seamlessly within their applications and/or processing schemes. It is noted that the various modules may be used selectively or in combination within the context of a resource allocation or access scheme.

Figure 6:
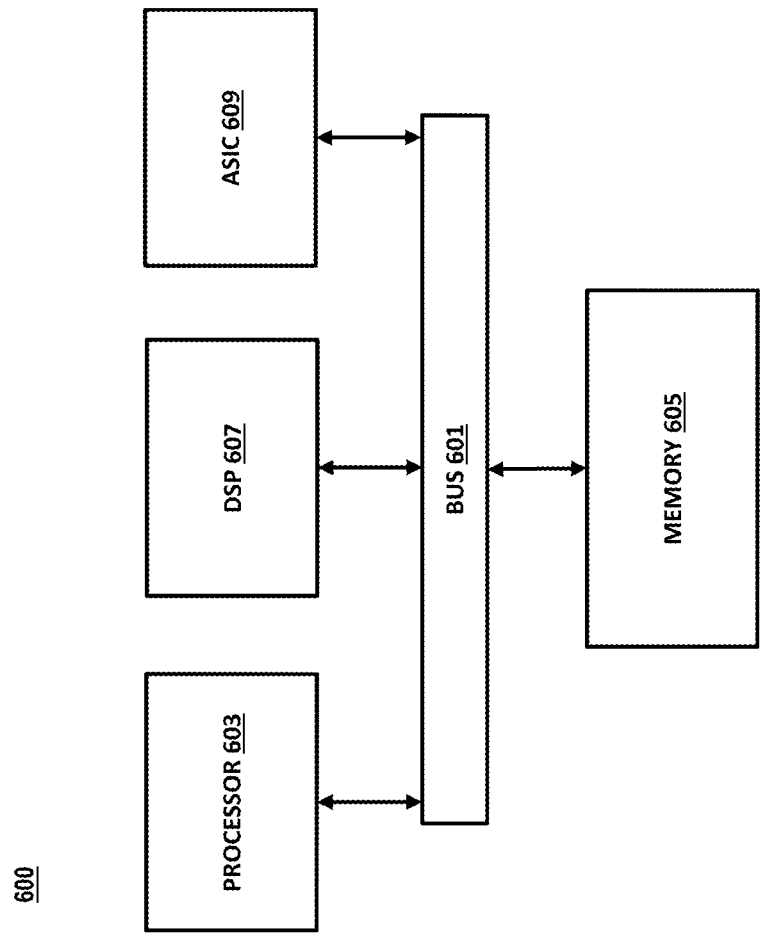
FIG. 6 is a diagram of a chip set that can be used to implement an embodiment of the invention.

FIGS. 3A-3C are flowcharts of processes for enabling multi-factor biometric authentication of a user based on different data capture modalities of a mobile device, according to various embodiments. In one embodiment, the biometric enabler 103 performs processes 300, 308 and 314 and is implemented in, for instance, a chip set including a processor and a memory as shown in FIG. 6. For the purpose of illustration, the processes are described with respect to FIG. 1. It is noted that the steps of the process may be performed in any suitable order, as well as combined or separated in any suitable manner. Furthermore, the biometric enabler 103 may perform several of the processes in connection with the mobile device, a network service for enabling distributed processing, or a combination thereof.

In step 301 of process 300 (FIG. 3A), the biometric enabler receives a request for authentication of a user via a network at a mobile device (e.g., user device) of the user. As noted previously, the request may be presented to the user, such as via the device display, in response to a user initiated attempt to access a service or other resource from the device. This may include, for example, the initiating of a transaction via the service that requires use of the network. Alternatively, the user may invoke the authentication via a dedicated application 119 at the mobile device (e.g., an application designed specifically for a given resource). Resultantly, the service or other resource transmits a notification to the device that biometric authentication of the user is required in order for the user to proceed further.

In another step 303, the enabler 103 determines a capture condition of the mobile device. The capture condition may be based on context information gathered by way of various sensors of the device. Context information may include location information, a mobile device identifier, a resource identifier, time information, network information, light information, sound information, device or resource usage information, or a combination thereof. Additional context information, including locomotion (i.e., user movement, direction, speed), mobile device radio connectivity and signal strength, user's previous location (e.g., where they travelled from), etc., may also be leveraged. The enabler 103 processes this information to determine a lighting condition, temporal condition, sound condition, usage preference of the user with respect to the device, service or resource, or other contextual condition associated with the device requiring access to the resource.

In another step 305, the biometric enabler initiates a capture of media associated with the user at the mobile device based on the request for authentication. The media may include, for example, voice data, video data, image data, odor data, or any other data capable of being used for uniquely identifying the user in question. The capture procedure may include, for example, the presentment of instructions for the user to utter a password, sequence of numbers or phrases, performance of a particular facial gesture, or the like. Per step 307, the enabler determines, in response to the request, whether the media is associated with different types of biometric information of the user as maintained in association with a resource that requires authentication of the user. As noted previously, this may correspond to an authentication analysis, wherein the captured media is compared against known baseline biometric data maintained for the user in question. This analysis may be carried out by the biometric enabler 103, by an offline processing agent, or a combination thereof based on various data processing and recognition techniques.

In step 309 of process 308 (FIG. 3B), the biometric enabler initiates a capture of context information associated with the mobile device, the user, or a combination thereof. As noted previously, the capture condition may be based on the context information. As such, the capture condition includes a light intensity, a sound intensity, a usage level of the mobile device, a usage level of the resource, or a combination thereof. In another step 311, the enabler determines a capture modality of the mobile device based on the capture condition, a preference of the user, or a combination thereof. As mentioned previously, the capture modality may correspond to different modes of operation of the device, including the following: limiting the presentment of captured video data to a predetermined portion of the face of the user, preventing the capture of video data related to the user, presenting an alternative view of the face of the user, presenting an augmented view of the surroundings of the user, or a combination thereof.

Per step 313, the biometric enabler adapts a trust level to be associated with the media based on the capture modality. As noted, the determination of whether the media is associated with different types of biometric information may be based on the trust level. Of further note, the media includes voice data, and the capture modality includes cancelling noise associated with the voice data, preventing the capture of voice data related to the user, rendering one or more other sounds based on the alternative view of the user or the surroundings of the user, or a combination thereof.

In step 315 of process 314 (FIG. 3C), the biometric enabler selectively authenticates the user based on the result. The selective authentication corresponds to the biometric authentication procedure as performed concurrent with the user selected capture modality. Hence, the authentication is performed in a manner wherein the user is allowed to select a preferred means of capture of the media required for analysis against baseline biometric data. In another step 317, the enabler 103 logs the access, use, entry, execution or allocation of the resource to the user, the mobile device, or a combination thereof based on the authentication of the user.

FIGS. 4A-4D are diagrams of a user of a mobile device accessing a resource based on multi-factor biometric authentication, according to various embodiments. For the purpose of illustration, these diagrams are described with respect to an exemplary use case of a user initiating the enrollment process via their mobile device. In addition, FIG. 4E is a diagram of a user of a mobile device establishing user preferences with the biometric enabler of FIG. 1, according to one embodiment.

Figure 4A:
FIGS. 4A-4D are diagrams of a user of a mobile device enrolling with the biometric enabler of FIG. 1, according to various embodiments.
Figure 4B:
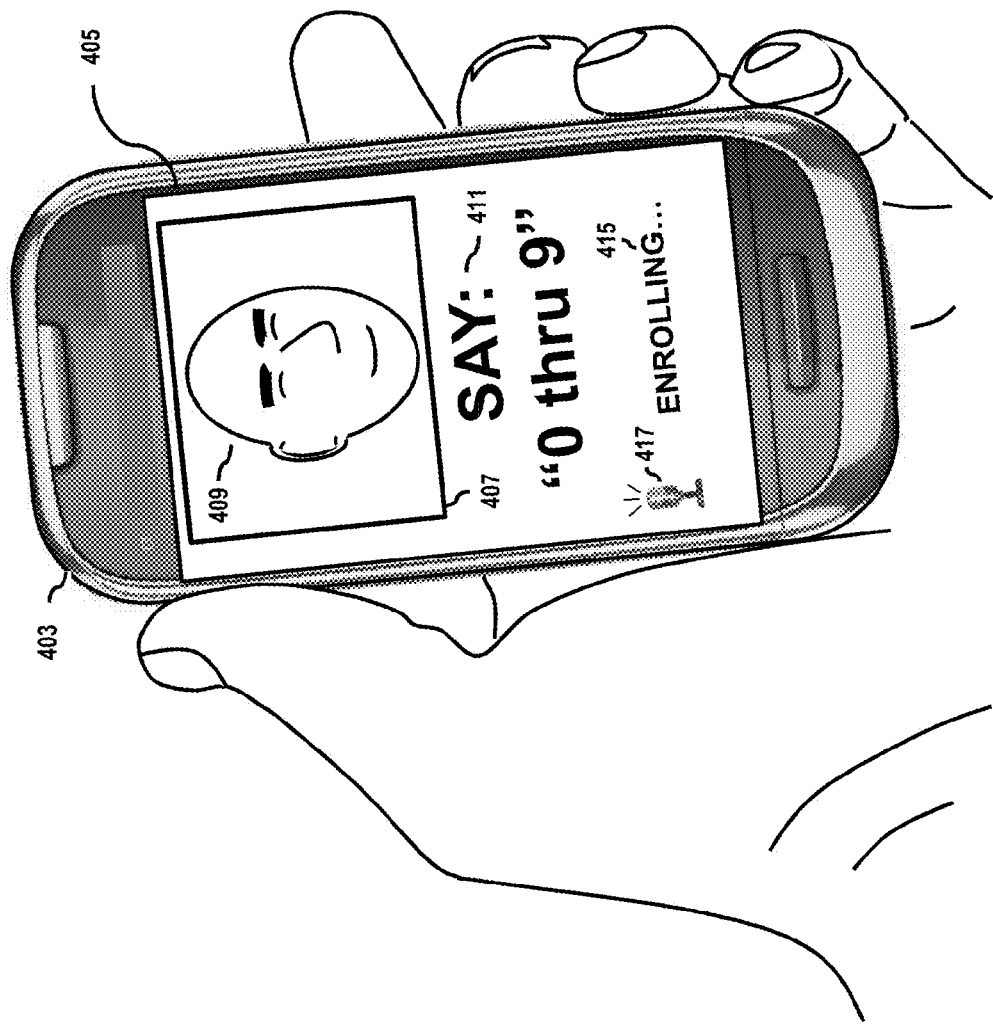

In FIGS. 4A and 4B, the user 401 initiates the enrollment process by way of an application at their mobile device 403. The application may execute instructions for enabling it to interface with the biometric enabler 103 via a network, wireless link, or through direct device control means. Also, the application may be a browser or web portal tool capable of interfacing with the biometric enabler 103 via a communication network. Under this scenario, the biometric enabler 103 initiates the gathering of a first set of biometric data (e.g., baseline biometric data). As such, the application is caused to render various commands, questions and/or task requests to a user interface 405 of the device 403 for execution of the enrollment process. In certain embodiments, it is contemplated that the application causes rendering of the various commands, questions and/or task requests at the time of device activation (e.g., when the phone is switched on), at the time of initial registration with a service that supports biometric authentication, or at the request of the user for later use in connection with a resource.

In FIG. 4B, an instruction is rendered to the user interface 405 for requesting the user to face into a camera of the device 403 such that an image of their face is shown within a designated viewing area 407. For the purpose of illustration with respect to the enrollment procedure, the viewing area 407 is intended to present a full view of the user's face. Alternatively, the biometric authentication request may be automatically initiated, such as in response to the opening or activating of the mobile device. Under this scenario, no instruction need be rendered to the user interface 405. In response to the enrollment request, the user may adjust the orientation and/or position of the mobile device for complying with this request, i.e., to adjust the depth of the camera lens accordingly. One or more algorithms may be employed by the biometric enabler 103 for detecting that a face 409 is within view (e.g., face detection).

Figure 4C:
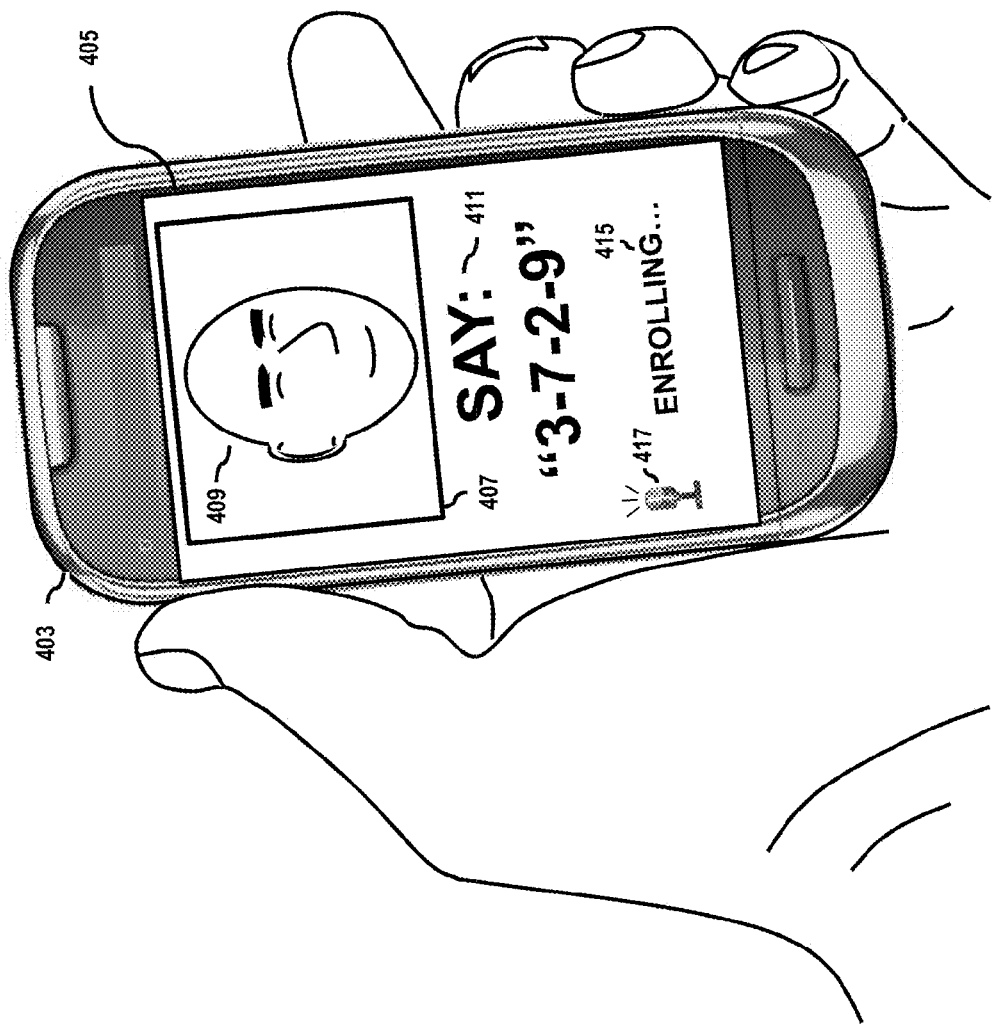

In addition to facing the camera, the user 401 is also presented with an instruction 411 to recite all the digits ranging from 0 to 9, as shown in FIG. 4B. Alternatively, as an additional enrollment requirement and/or as a randomly generated authentication challenge, the instruction may be for the user to recite various random digits, as shown in FIG. 4C. The user recites the digits while simultaneously facing the camera of the device 403. In FIG. 4A, the recitation is depicted as transmission of an audio signal 413/sound from the user's mouth. As a result, biometric data is captured accordingly, and the user interface renders a status message 415 for indicating enrollment is underway. A microphone icon 417 is also presented to the user interface 405 for indicating an audio signal 413 is currently being detected and recorded concurrent with the capture of the video data 407 per the enrollment procedure. This video data may be of the user's face 409, but in other use cases, may include other images or parts of a user's body (e.g. mouth, eyes, hand, etc.). For example, a user's mouth movements may be recorded in conjunction with the user's audio speech as they say the numbers 0-9. This information may be parsed and used later in the authentication of the user similar to use under FIG. 4G below. By parsing the information the random user command of saying "3-7" may be used to authenticate the user by verifying the mouth movements in conjunction with the audio speech. Alternatively, the icon 417 may be a video camera icon for indicating video footage of the user is being captured per the enrollment process. While not shown, additional instructions and/or commands relative to the authentication procedure may be presented to the user interface accordingly, including those instructions pertaining to the capture of retinal, iris or vein characteristics.

Figure 4D:
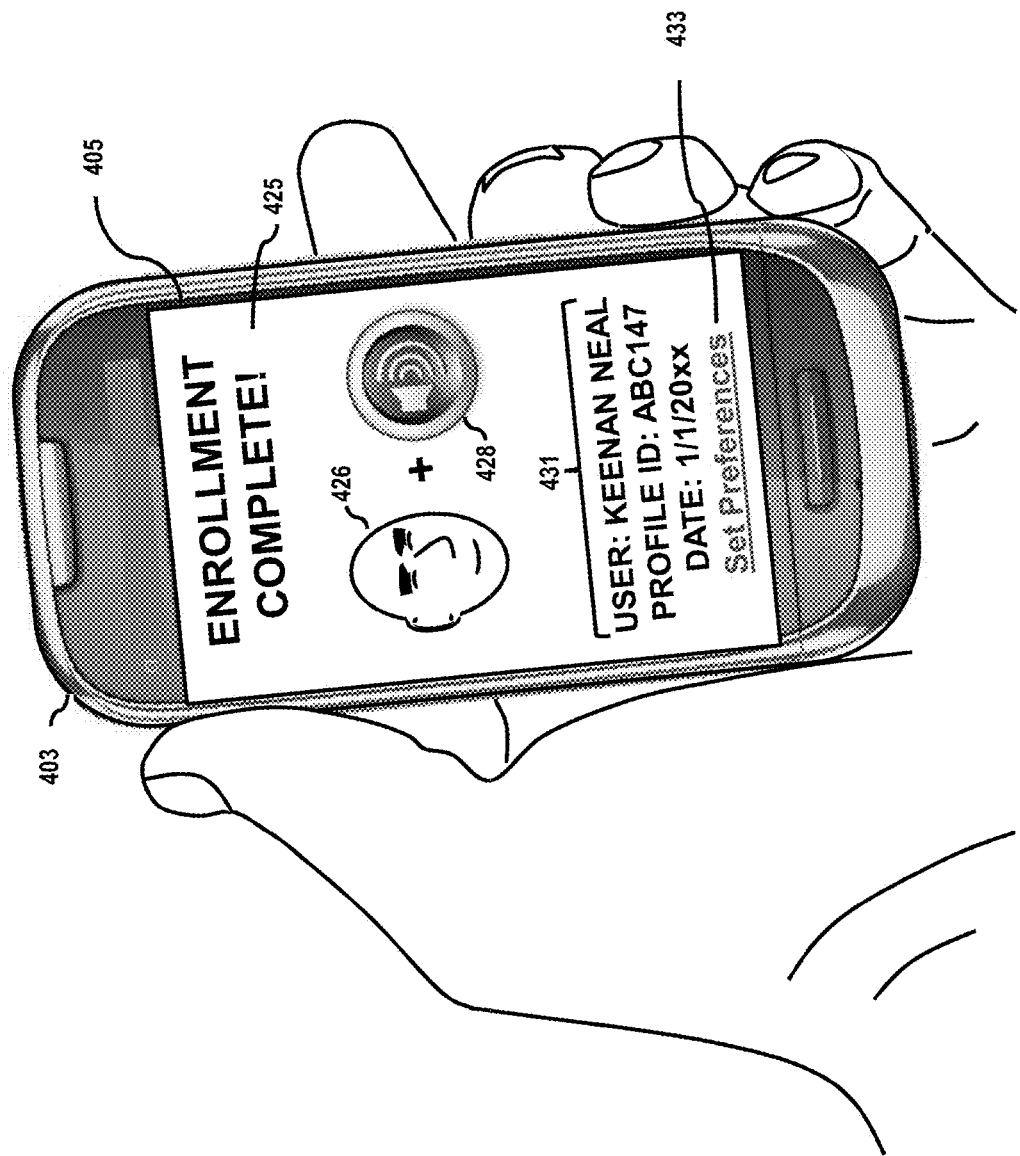
Figure 4E:
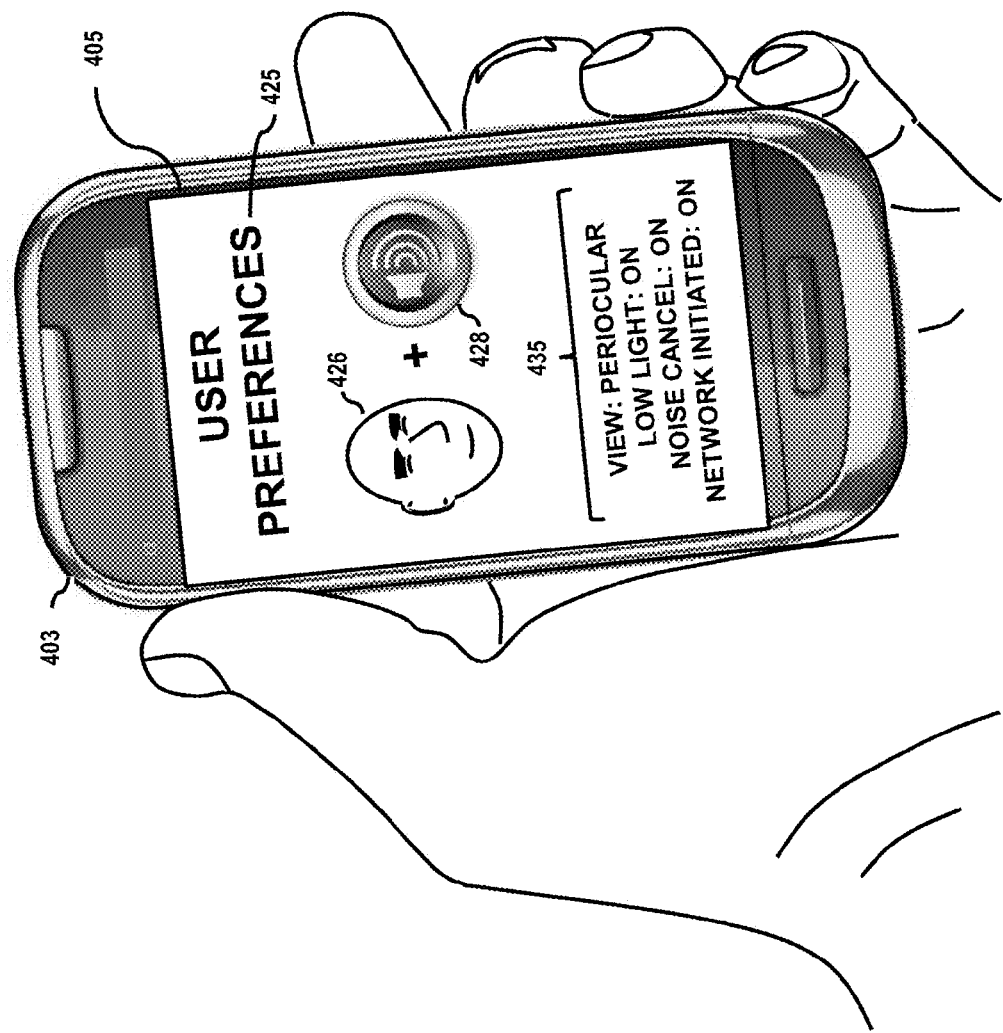
FIG. 4E is a diagram of a user of a mobile device establishing user preferences with the biometric enabler of FIG. 1, according to one embodiment.

Once the user responds to all of the questions and the biometric data is recorded, an enrollment completion message 425 is rendered to the user interface 405 (per FIG. 4D). In addition to specifying completion of the enrollment process, the message 425 includes a graphic 426 depicting the user's face as well as an icon 428 depicting an audio signal. The graphic and icon 426 and 428 respectively are representative of the multiple different types of biometric data captured via enrollment—i.e., for use in generating a baseline biometric profile of the user. In certain embodiments, user profile data 431 regarding the user is also presented for specifying the user to which the biometric data correlates. Also, a link 433 for enabling the user to further establish various user preferences, such as a preferred capture modality of the user device during authentication, may also be selected.

In FIG. 4E, upon selection of the user preferences link 433, the user is presented with various preference settings options for impacting the mode of operation of the user device during execution of the authentication procedure. These settings correspond to that required for impacting the experience of the user, such as to ensure user comfort and ease of use of the resource and/or the biometric enabler for performance of the authentication. By way of example, the preference settings 435 may include a view setting, which in the example is set to periocular. Alternative options available to the user, however, may include a periocular and mouth view, an avatar view of the user, a computer generated depiction of the user, etc.

A low light condition setting may also be activated as OFF or ON, for affecting the behavior of the mobile device 403 in response to the detection of a low light condition. Similarly, a noise cancellation setting may also be activated as OFF or ON, for affecting the behavior of the mobile device 403 in response to the detection of high levels of noise within the proximity of the mobile device 403. Still further, a network initiation setting may be set OFF or ON, for affecting the ability of the biometric enabler 103 to operate in connection with the mobile device 403 for enabling network based biometric authentication to commence. Under this scenario, the authentication request may be allowed to be received from a corresponding service being accessed by the mobile device 403 via the network.

FIGS. 4F-4J are diagrams of a mobile device performing multi-factor biometric authentication of a user based on different data capture modalities of the mobile device, according to various embodiments. For the purpose of illustration, the diagrams are described with respect to an exemplary use case of a user attempting to perform a banking transaction with a network service offered by BANK_A.com. Under this scenario, it is assumed that the user has already established baseline biometric data prior to execution of the depicted transaction and that data is associate with a user profile available to the service provider.

Figure 4F:
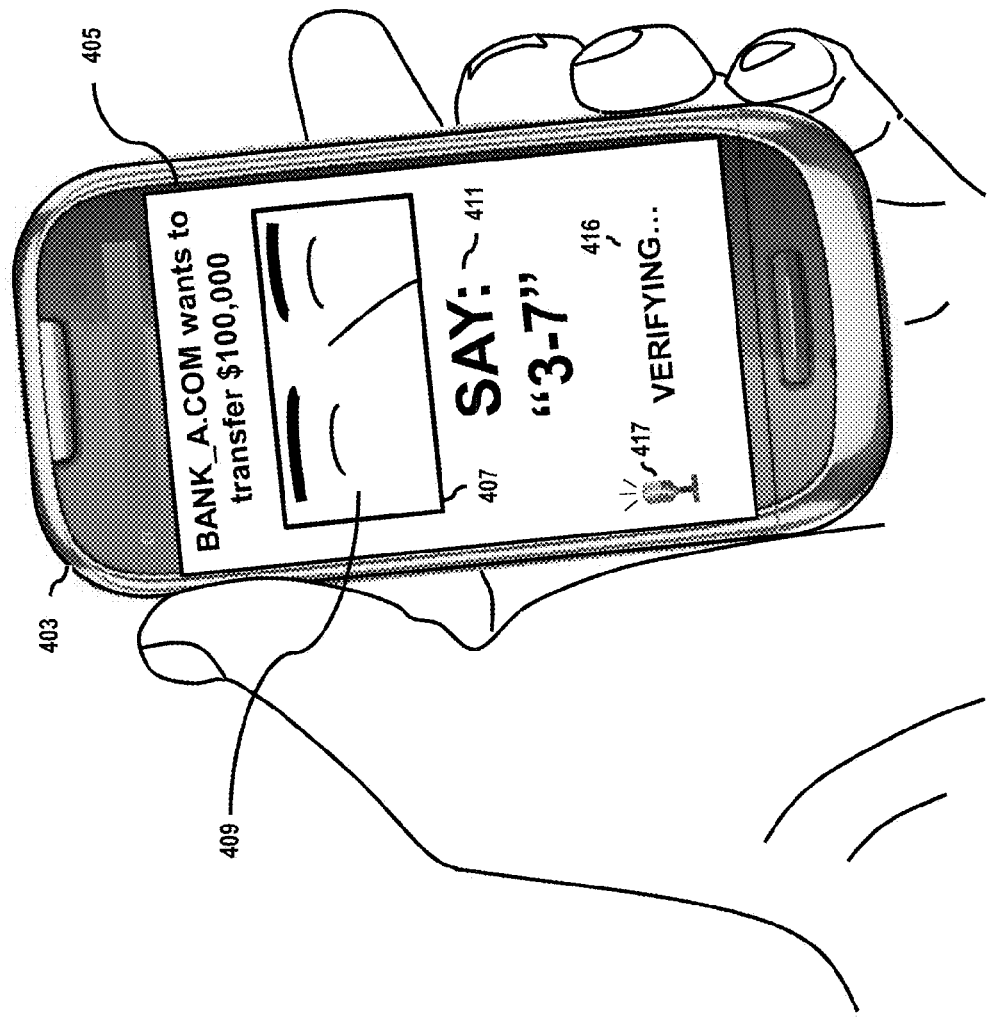
FIGS. 4F-4J are diagrams of a mobile device performing multi-factor biometric authentication of a user based on different data capture modalities of the mobile device, according to various embodiments.

In FIG. 4F, as the user attempts to perform the transfer of a sum of money to another account, the biometric enabler 103 may retrieve various resource policies established by the provider of the service for determining the user is allowed to perform such transactions. The policies may include details regarding the user's access rights (or level thereof) with respect to the online banking service, the authentication procedure to be performed, etc. In this scenario the authentication procedure includes rendering of a security and/or authentication command to the user interface 405; the authentication being required to permit the banking transaction to be performed. The command 411 is a request for the user to utter their identifier (e.g., customer identifier, bank security identifier, challenge phrase) for capture by a microphone of the mobile device 403. The authentication procedure also calls for the user to face into the camera of the mobile device 403, such that their face 409 is shown within a viewing area 407. Under this scenario, the capture modality corresponds to a periocular modality of the mobile device 403, such that the viewing area 407 is limited to presentment of only the area surrounding the eyes 409 of the user. Once the user begins speaking, the biometric enabler 103 captures the biometric data as response input.

Figure 4G:
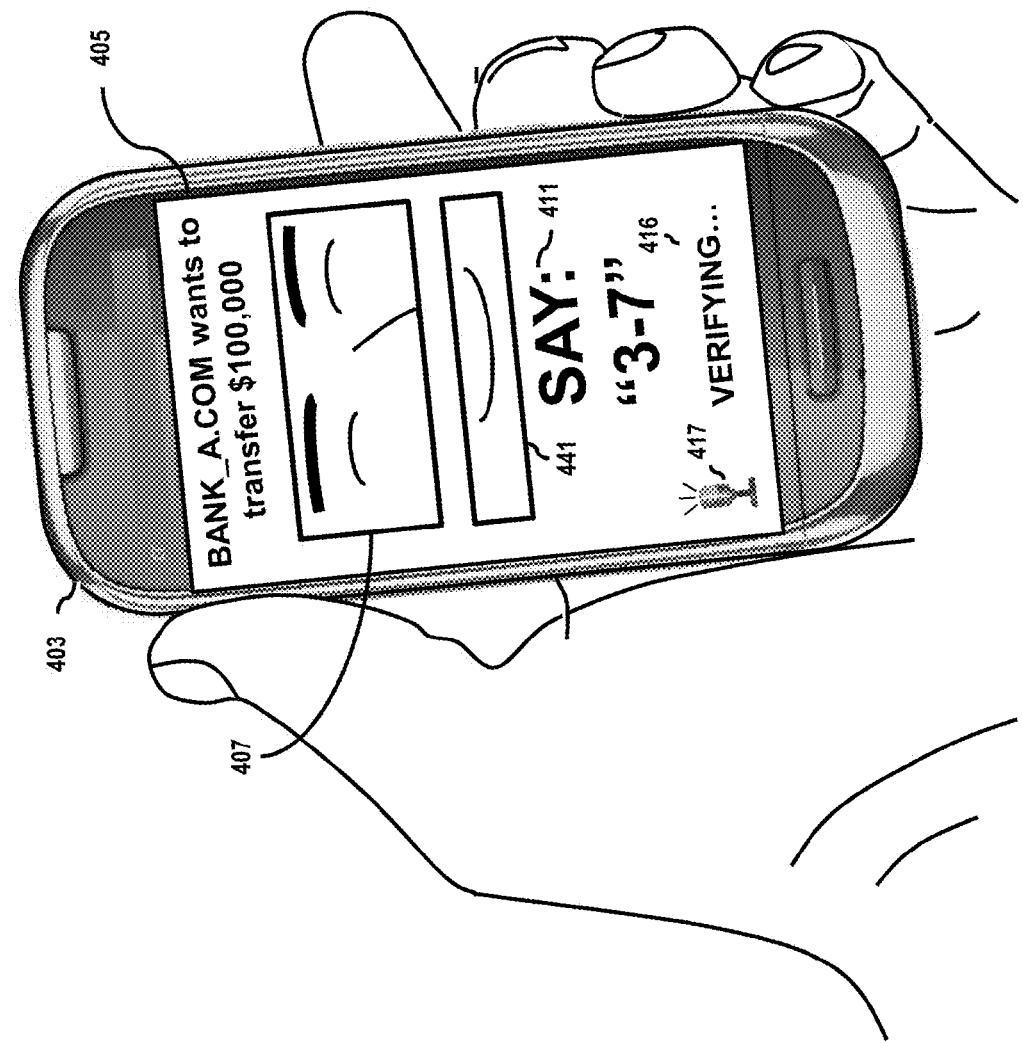

In FIG. 4G, the same procedure is presented with respect to a partial view modality of the mobile device. Under this scenario, the user is presented with a periocular view of their eyes per viewing area 407 along with an additional view 441 of their mouth. The user responds to the commands while facing the camera of the device 403, which dissect the image of the user's face into the respective different views 407 and 441. Alternatively, it is contemplated that the user device 403 may be equipped with multiple different camera sensors for capturing the different areas of the user's face simultaneously.

Figure 4H:
Figure 4I:
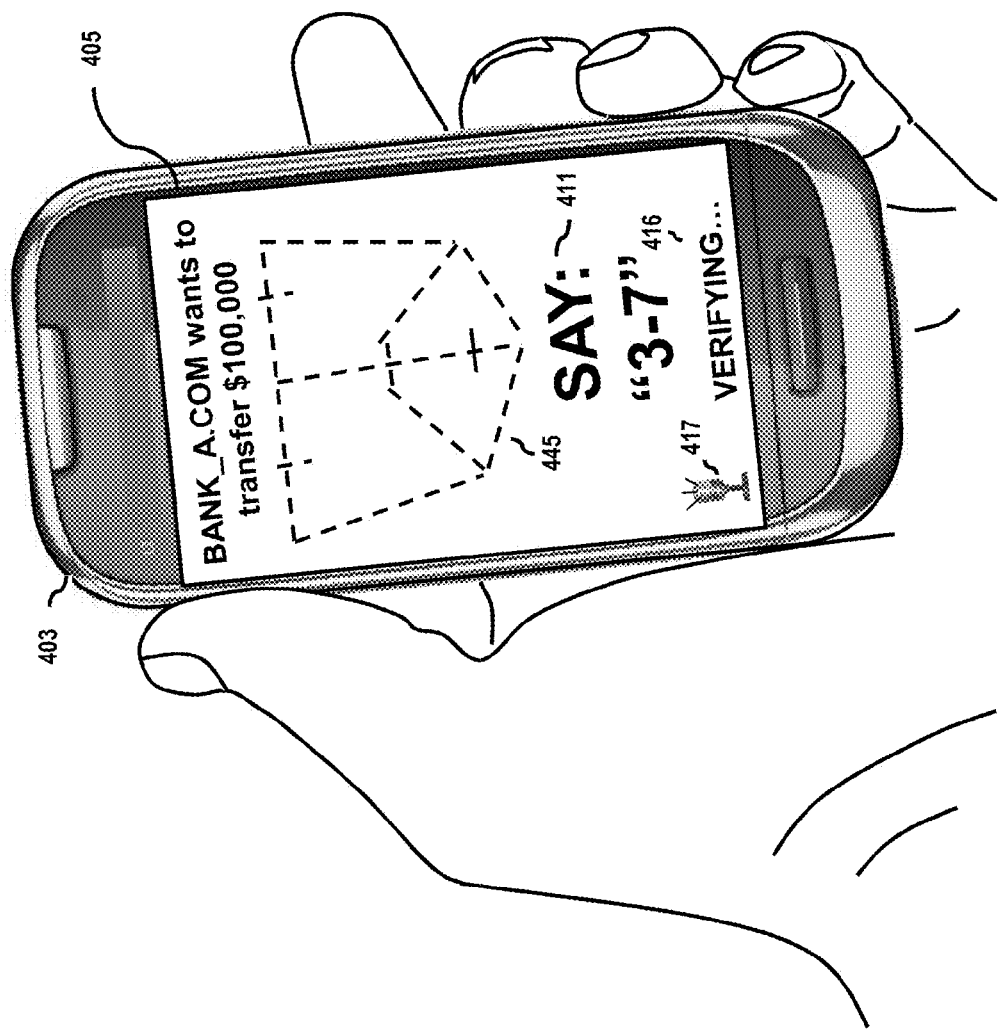

In FIG. 4H, the user is presented with an alternate image corresponding to the alternate image modality of the mobile device 403. Under this scenario, the alternate image is an avatar 443 as specified by the user per their user profile. It is noted that any image may be selected for use by the user, including an image of their favorite celebrity, a symbol, a custom text message (e.g., "You are so handsome!"), etc. Avatar 443 may be animated to mirror the user's facial expressions. Still further, the alternate image modality may enable the presentment of a face outline view 445, wherein an outline of the face is presented to the display 405 as one or more dashed lines (FIG. 4I). It is noted that the biometric enabler 103 may accommodate any images, graphics primitives, textual elements, augmented reality, or the like for rendering relevant visual feedback to the user at the display 405 during execution of the authentication procedure.

Once a response input in the form of voice and face data is provided, the biometric enabler 103 analyzes the input using various data recognition techniques and algorithms for determining a correlation between the biometric data as captured during authentication against the biometric data compiled during enrollment or user biometric baseline data created from user data (e.g., in relation to the seeded biometric baseline data). During this time, a status message may be subsequently rendered to the user interface for indicating the authentication process is underway. As noted, the recognition schemes may include voice, facial, ear, vein, iris, retina, and motion recognition.

Figure 4J:
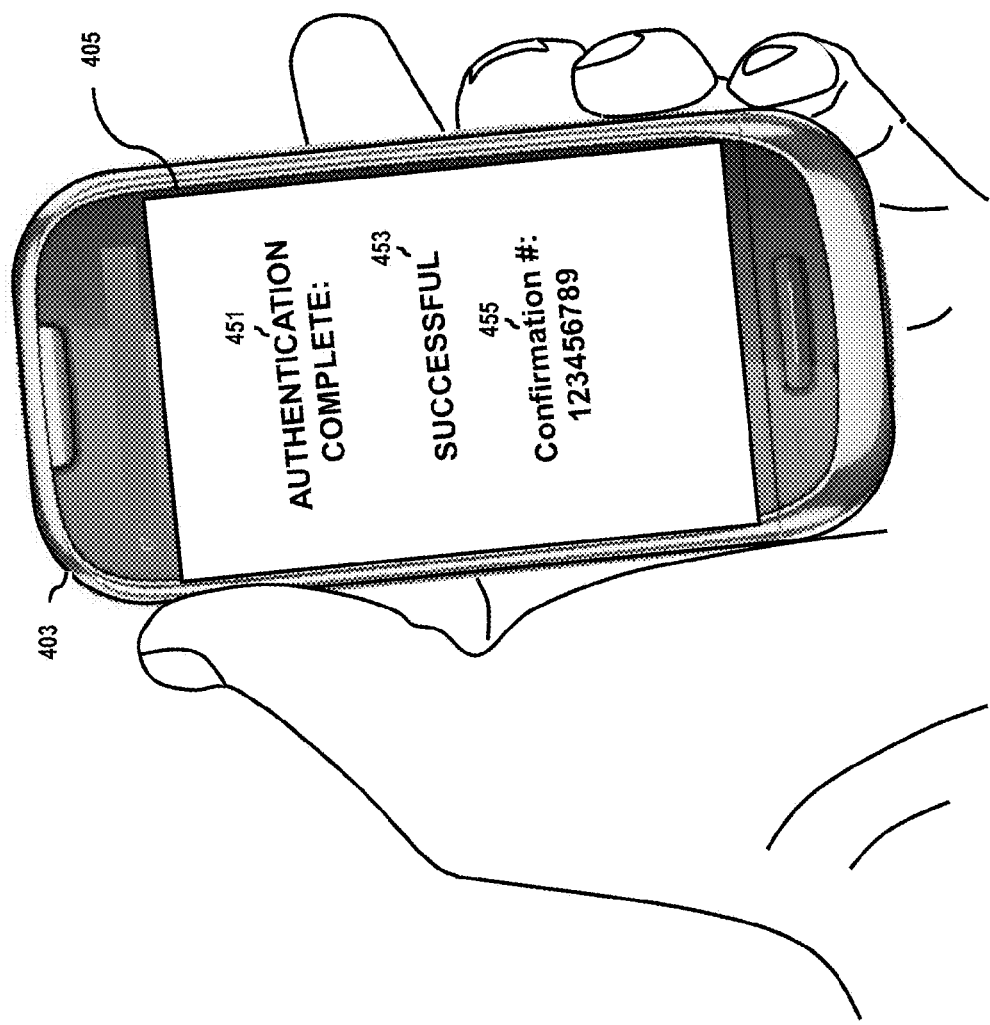

In FIG. 4J, once the correlation is determined, the authentication procedure is deemed complete. Under this scenario, an authentication completion message 451 is presented to the user interface 405 for indicating the transfer transaction is allowed. Additionally, the recorded information below may be presented to the user interface. Resultantly, the biometric enabler 103 generates a record/log of the result of this transaction. The record may include temporal information corresponding to the transaction, name/customer/profile/location information regarding the user that authorized the transaction, the authentication result 453 (e.g., SUCCESSFUL or UNSUCCESSFUL), the transaction type and amount, a confirmation number 455, etc.

The exemplary techniques and systems presented herein enable multi-factor biometric authentication of a user based on different data capture modalities of a mobile device. One advantage of the exemplary techniques and systems presented herein is the ability of the biometric enabler 103 to support enrollment and authentication with respect to different user specified operational modes of the device performing the data capture. The result is increased facial recognition accuracy as the nuances of the user's face, iris, retina, ear, veins, speech patterns, gestures, etc., are accounted for along with enhanced user comfort during the data gathering process. As another advantage, the above described processes and arrangements advantageously permit enhanced security using a multi-factor biometric authentication procedure that, for example, can be implemented utilizing minimal resources, and thus, can be suitable for mobile devices and users having different preferences.

The processes described herein for enabling multi-factor biometric authentication of a user based on different data capture modalities of a mobile device may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
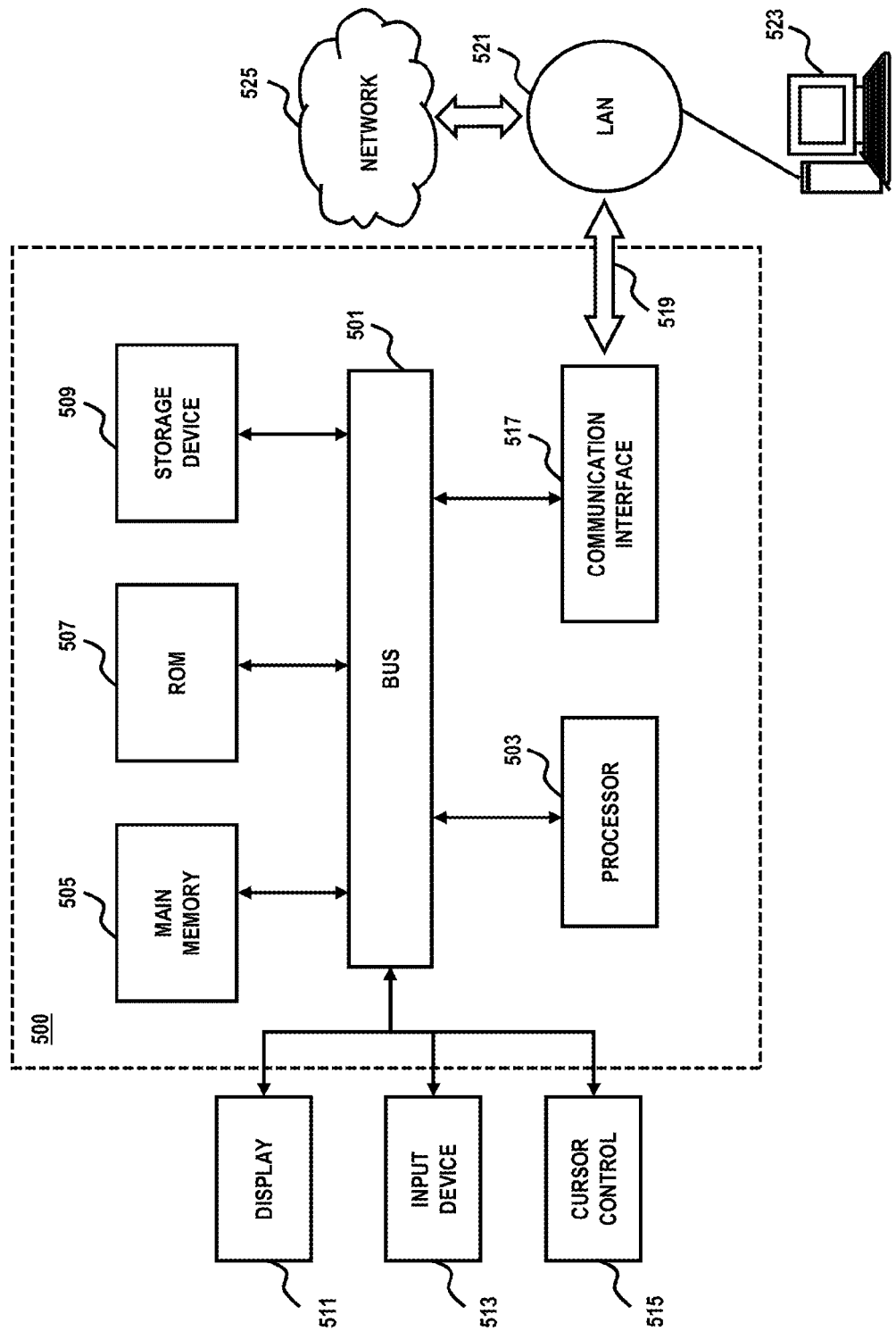
FIG. 5 is a diagram of a computer system that can be used to implement various exemplary embodiments.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, flash disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 6 illustrates a chip set or chip 600 upon which an embodiment of the invention may be implemented. Chip set 600 is programmed to enable multi-factor biometric authentication of a user based on different data capture modalities of a mobile device as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of enabling multi-factor biometric authentication of a user based on different data capture modalities of a mobile device.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to enable multi-factor biometric authentication of a user based on different data capture modalities of a mobile device. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    receiving a request for authentication of a user via a network at a mobile device of the user;
    determining a capture condition of the mobile device, based on profile data of the user, sensors of the device, a preference of the user specified in the profile, or a combination thereof;
    initiating a capture of media associated with the user at the mobile device based on the request and the capture condition;
    adapting a trust level to be associated with the media based on the capture modality,
    wherein different biometric information has different trust level, and
    determining, in response to the request, whether the media is associated with different types of biometric information of the user as maintained in association with a resource that requires authentication of the user, wherein the determination of whether the media is associated with different types of biometric information is based on the trust level.

2. A method of-claim 1, further comprising:
initiating a capture of context information associated with the mobile device, the user, or a combination thereof,
wherein the capture condition is based on the context information, and the capture condition includes a light intensity, a sound intensity, a usage level of the mobile device, a usage level of the resource, or a combination thereof.

3. A method of claim 2, wherein the context information includes location information, a mobile device identifier, a resource identifier, time information, network information, light information, sound information, usage information, or a combination thereof.

4. A method of claim 2, wherein the result of the determination of whether the media is associated with different types of biometric information is based on the context information.

5. A method of claim 1, wherein the capture modality includes limiting the presentment of captured video data to a predetermined portion of the face of the user, preventing the capture of video data related to the user, presenting an alternative view of the face of the user, presenting an augmented view of the surroundings of the user, or a combination thereof.

6. A method of claim 1, wherein the media includes voice data, and the capture modality includes cancelling noise associated with the voice data, preventing the capture of voice data related to the user, rendering one or more other sounds based on the alternative view of the user or the surroundings of the user, or a combination thereof.

7. A method of claim 1, further comprising:
selectively authenticating the user based on the determining, in response to the request; and
logging the access, use, entry, execution or allocation of the resource to the user, the mobile device, or a combination thereof based on the authentication of the user.

8. A method of claim 1, wherein the resource is another mobile device, a wireless node, a security system, a controller, a service, or a combination thereof.

9. A method of claim 1, further comprising:
capturing non-biometric media associated with the user at the mobile device based on the request and the capture condition,
wherein the determining, in response to the request, includes determining whether the non-biometric media and media are associated with different types of non-biometric and biometric information of the user as maintained in association with a resource that requires authentication of the user.

10. A method of claim 9, wherein the non-biometric media includes noise, ambient noise, lighting, or a combination thereof.

11. An apparatus comprising:
at least one processor; and
at least one memory including computer program code for one or more programs,
the at least one memory and the computer program code configured to, with the at least one processor, cause the apparatus to perform at least the following,
receive a request for authentication of a user via a network at a mobile device of the user;
determine a capture condition of the mobile device, based on profile data of the user, sensors of the device, a preference of the user specified in the profile, or a combination thereof;
initiate a capture of media associated with the user at the mobile device based on the request and the capture condition;
wherein different biometric information has different trust level, and
determine, in response to the request, whether the media is associated with different types of biometric information of the user as maintained in association with a resource that requires authentication of the user, wherein the determination of whether the media is associated with different types of biometric information is based on the trust level.

12. An apparatus of claim 11, wherein the apparatus is further caused to:
initiate a capture of context information associated with the mobile device, the user, or a combination thereof,
wherein the capture condition is based on the context information, and the capture condition includes a light intensity, a sound intensity, a usage level of the mobile device, a usage level of the resource, or a combination thereof.

13. An apparatus of claim 12, wherein the context information includes location information, a mobile device identifier, a resource identifier, time information, network information, light information, sound information, usage information, or a combination thereof.

14. An apparatus of claim 12, wherein the result of the determination of whether the media is associated with different types of biometric information is based on the context information.

15. An apparatus of claim 11, wherein the capture modality includes limiting the presentment of captured video data to a predetermined portion of the face of the user, preventing the capture of video data related to the user, presenting an alternative view of the face of the user, presenting an augmented view of the surroundings of the user, or a combination thereof.

16. An apparatus of claim 11, wherein the media includes voice data, and the capture modality includes cancelling noise associated with the voice data, preventing the capture of voice data related to the user, rendering one or more other sounds based on the alternative view of the user or the surroundings of the user, or a combination thereof.

17. An apparatus of claim 11, wherein the apparatus is further caused to:
selectively authenticate the user based on the determining, in response to the request; and
log the access, use, entry, execution or allocation of the resource to the user, the mobile device, or a combination thereof based on the authentication of the user.

18. An apparatus of claim 11, wherein the resource is another mobile device, a wireless node, a security system, a controller, a service, or a combination thereof.

\* \* \* \* \*